United States Patent [19] [11] Patent Number: 4,698,001
Vismara [45] Date of Patent: Oct. 6, 1987

[54] MACHINE FOR THE PRODUCTION OF MOULDED ARTICLES OF PLASTIC MATERIAL, IN PARTICULAR OF CRASH HELMETS FOR MOTORCYCLISTS AND THE LIKE

[75] Inventor: Mario Vismara, Casatenovo, Italy

[73] Assignee: Devi S.p.A., Besana Brianza, Italy

[21] Appl. No.: 744,696

[22] Filed: Jun. 14, 1985

[30] Foreign Application Priority Data

Jun. 15, 1984 [IT] Italy ............................... 22307/84[U]

[51] Int. Cl.⁴ ..................... B29C 33/34; B29C 67/20
[52] U.S. Cl. ..................................... 425/4 R; 425/134;
425/359; 425/581; 425/584
[58] Field of Search ............... 425/4 R, 412, 457, 130,
425/134, 345, 347, 351, 407, 415, 817 R, 346,
447, 581, 584, 359, 423; 264/51, 53, DIG. 10,
255, 45.4, 55

[56] References Cited
U.S. PATENT DOCUMENTS

| 2,989,782 | 6/1961 | Barkhuff et al. | 264/45.4 |
| 3,159,875 | 12/1964 | Stutz et al. | 425/817 R |
| 3,351,979 | 11/1967 | Buonaiuto | 264/53 |
| 3,671,621 | 6/1972 | Fukuoka | 425/134 |
| 3,793,415 | 2/1974 | Smith | 264/55 |
| 3,935,044 | 1/1976 | Daly | 264/51 |
| 4,106,884 | 8/1978 | Jegelka | 264/DIG. 10 |
| 4,192,638 | 3/1980 | Cezcer et al. | 425/256 |
| 4,233,006 | 11/1980 | Panas | 425/4 R |
| 4,255,368 | 3/1981 | Olahisi | 425/4 R |
| 4,327,045 | 4/1982 | Nishikawa et al. | 425/4 R |
| 4,333,897 | 6/1982 | Hayashi et al. | 425/4 R |
| 4,389,358 | 6/1983 | Hendry | 425/4 R |
| 4,426,348 | 1/1984 | Salisbury | 264/53 |
| 4,655,388 | 10/1977 | Johns | 425/4 R |

OTHER PUBLICATIONS

Anon., Conair, Minimizer Fill Gun System, Conair, Inc., Franklin, Pa. (1967).

Primary Examiner—Willard E. Hoag
Attorney, Agent, or Firm—Fleit, Jacobson, Cohn & Price

[57] ABSTRACT

A machine for the manufacturing of moulded articles of plastic material, in particular of helmets for motor cyclists, includes at least two moulds and at least a counter-mould for the forming of the articles, the moulds and counter-mould(s) defining between themselves moulding cavities of different shapes. The moulds and the counter-moulds, excepting the first one, are each connected with a feeder of a different plastic material, and the moulds can be moved into alignment with the counter-moulds, for the moulding of respective superimposed layers of different plastic materials by sintering with steam.

One mould is suitable to be positioned in correspondence of a zone of unloading of the article produced while at least another mould is in its forming position.

6 Claims, 22 Drawing Figures

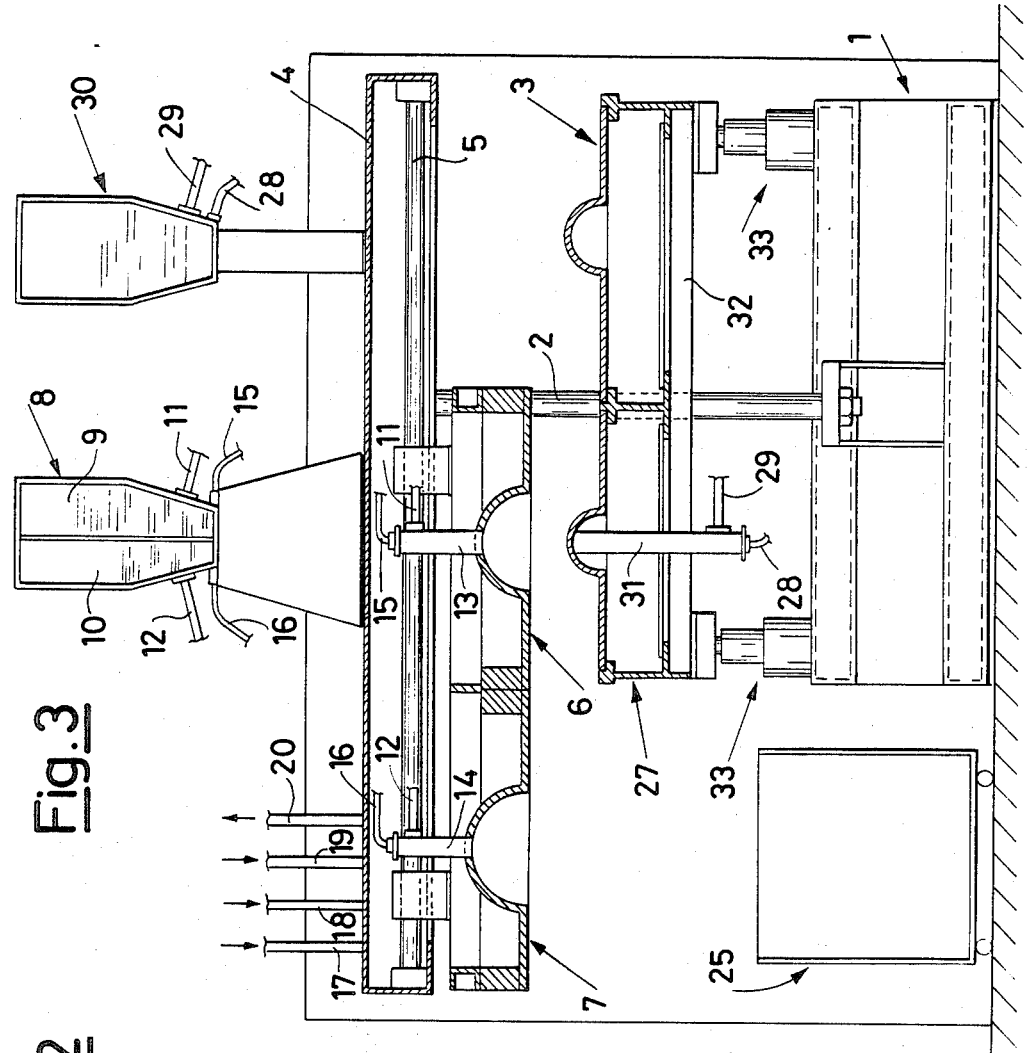
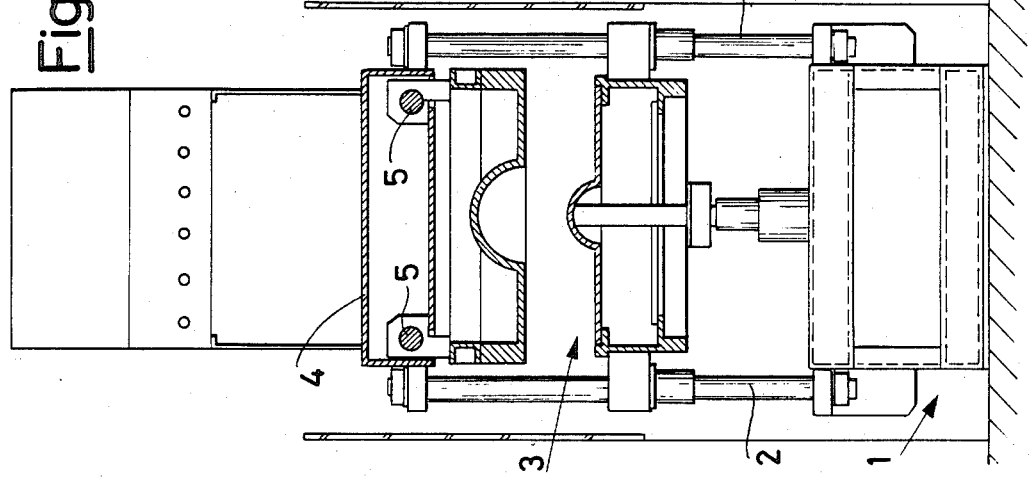

MACHINE FOR THE PRODUCTION OF MOULDED ARTICLES OF PLASTIC MATERIAL, IN PARTICULAR OF CRASH HELMETS FOR MOTORCYCLISTS AND THE LIKE

The present invention relates to a machine for the production of moulded articles of plastic material, in particular of crash helmets for motor cyclists and the like.

It is known that in the art of articles of plastic material, moulding difficulties are met in the fitting of the moulding technique to the needs presented by the article type to be produced. In general, it is the article which must be modified in order to make it possible to manufacture it by means of certain known moulding techniques.

It may therefore happen that the end article loses some characteristics or shows some properties to a limited extent only, in that it cannot be otherwise obtained by moulding.

Thus in the manufacturing e.g. of crash helmets for motor cyclists, motorized bycicle drivers or the like, the demands to be satisfied by the helmet structure are hardly compatible with the technical possibilities offered by the moulding. The helmet must show in deed a considerable capability of impact absorption, an optimum resistance to the penetration by blunt bodies, as well as a certain lightness, so that it can be worn without discomfort. Such properties, typical of single materials, cannot be successfully accomplished in the known helmets, in that it is not generally possible, or anyway easy, to mould helmets made of a plurality of materials in the right combination and arrangement, for satisfying all the requirements described above.

On the other hand, the use of a plurality of materials of different mechanical or physical characteristics, or also different in colour, even if possible in certain particular cases, requires anyhow such a considerable constructional and financial effort that the obtained product are no longer competitive.

The purpose of the present invention is to provide a machine for the manufacturing of moulded articles of plastic material, in particular of helmets for motor cyclists and the like, allowing the moulding in a cheap way of articles made of a plurality of layers of different materials, the combination and the arrangement of the materials being suitable to achieve as far as possible the desired end characteristics of the article produced.

This purpose is achieved according to the invention by means of a machine for the manufacturing of moulded articles of plastic material, in particular of helmets for motor cyclists, comprising at least two moulds and at least a counter-mould suitable to be coupled with said moulds for the forming of said articles, characterized in that said moulds and said at least counter-mould define between themselves moulding cavities of different shapes and that said moulds and the counter-moulds, excepting the first one, are each connected with a feeder of a different plastic material, and that said moulds can be moved into alignment with said at least one counter-mould, to a position for the moulding of respective superimposed layers of different plastic materials, one mould being suitable to be positioned in correspondence of a zone of unloading of the article produced while at least another mould is in its forming position.

Advantageously the moulds may be positioned side-by-side and horizontally movable to a position of vertical alignment with said at least one counter-mould, so that the article moulded can be unloaded by gravity from the outmost mould, while at least another mould is carrying out the moulding of a respective layer of plastic material.

A machine according to the invention allows the obtainment of moulded articles, formed by a plurality of layers of different plastic materials, wherein each layer is made of the most suitable material as for the strength, the density, the lightness, and so on, with a reduced constructional effort at a high production rate, in that even a plurality of layers can be moulded simultaneously, while from the last mould the finished article is being unloaded. As an example, it is possible to manufacture a helmet made of two layers of different materials, with two moulds and a conter-mould, or a three-layer helmet with two moulds and two counter-moulds, as it will better appear hereinunder. Advantageously, the machine may be equipped for the moulding of a layer of e.g. high-density expanded polystyrene and of another layer of e.g. low-density polystyrene.

Further details and advantages of the invention shall become more evident from the following disclosure of a machine according to the invention, illustrated to exemplifying purposes in the attached drawings, wherein:

FIG. 2 shows a cross section of the machine of FIG. 1;

FIG. 3 is a schematic longitudinal section of a machine for the manufacture of a three-layer article;

FIGS. 5a–5l are schematically illustrative of the sequential working steps of the machine of FIG. 3;

Figure 1:
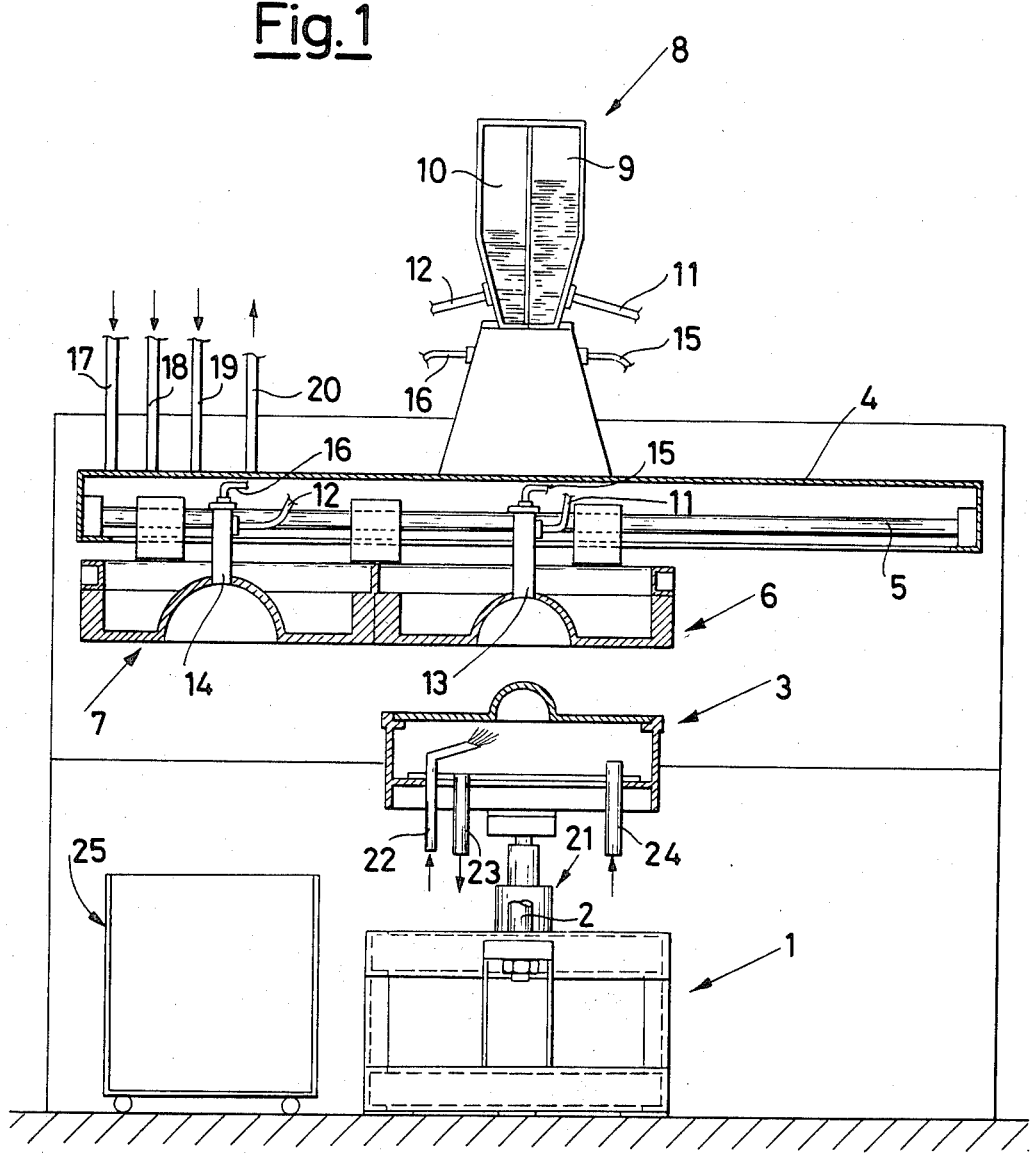
FIG. 1 shows in schematic longitudinal section a machine according to the invention for the manufacture of a two-layer article.

Referring first to FIGS. 1 and 2, a machine according to the invention for the manufacture of moulded articles of foamed plastic material, in particular of helmets for motor cyclists, comprises a base 1, supporting by means of columns 2 a counter-mould 3 vertically movable and a longitudinally extending box 4. Inside the box 4 horizontal longitudinal guide bars 5 extend, supporting two moulds 6 and 7 placed side-by-side. These moulds can therefore be horizontally moved to a respective position of vertical alignment with the counter-mould 3.

Above the box 4 a double feeder 8 is suspended, comprising two adjacent compartments 9 and 10, each filled with a different pre-foamed plastic material, e.g. of different density, composition, constitution, size or of different colour and so on. Each compartment 9, 10 is connected with a related mould 6, 7 through a related feeding line 11, 12 leading to the related injector 13, 14. By 15 and 16 the respective compressed-air feeding lines leading to the respective injectors 13, 14 are shown.

Into the box 4 a plurality of feeding lines 17, 18 and 19 enter, respectively suitable to feed compressed air, water and steam to the moulds 6 and 7 and to the counter-mould 3. By 20 a line is indicated, connected to a vacuum source not shown, and suitable to create a depressurization during the moulding step according to techniques per se known. The connections in correspondence of the moulds 6, 7 and the development of the various feeding lines inside the box 4 are not shown in detail, as they are per se known.

The counter-mould 3 is vertically movable by means of a hydraulic cylinder 21 fastened onto the base 1. By 22, 23 and 24 a cooling water feeding line, a discharge line and a steam feeding line, per se known, as respectively schematically shown.

The moulds 6 and 7 and the counter-mould 3 define between themselves moulding cavities of different shape. In particular, in the example shown, the counter-mould 3 is a male counter-mould and the moulds 6 and 7 are female moulds, defining, in their forming position, moulding cavities of substantially hemi-shell shape with different radii, to the purpose of achieving a helmet formed by two layers of different materials, as it will be seen shortly.

Sideways to the counter-mould 3 a container 25 is provided for collecting the finished article.

For the manufacture of a two-layer article, the moulds 6 and 7 can be respectively moved to a position of vertical alignment with the counter-mould 3, in their moulding position of the respective superimposed layers according to the working scheme illustrated in FIGS. from 4a to 4g.

Figure 4A:
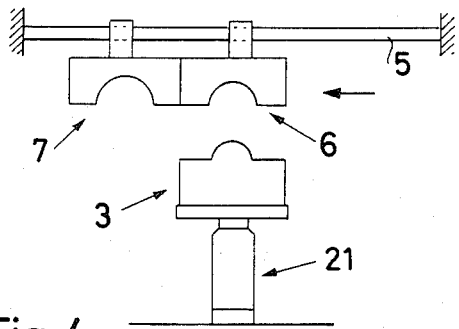
FIGS. 4a–4g are schematically illustrative of the sequential working steps of the machine of FIG. 1.
Figure 4B:
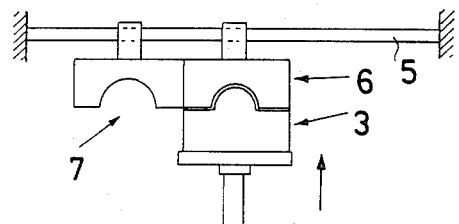

At first, the positioning takes place of the mould 6 above the counter- mould 3 (FIG. 4a) and then the lifting takes place of the counter-mould 3 to its moulding position, for the moulding of a first layer (FIG. 4b). The moulding step occurs by sintering . As an example, the layer may be moulded from low-density expanded polystyrene, initially in the form of small beads, which are sintered in a known way with the aid of steam.

Figure 4C:
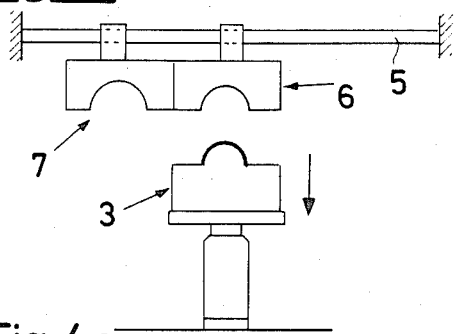
Figure 4D:
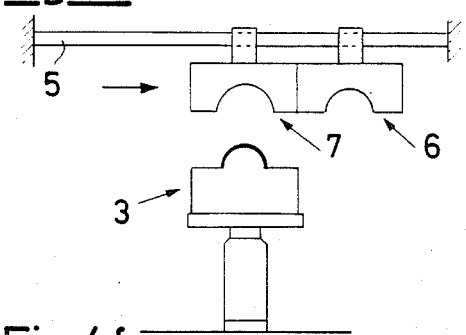
Figure 4E:
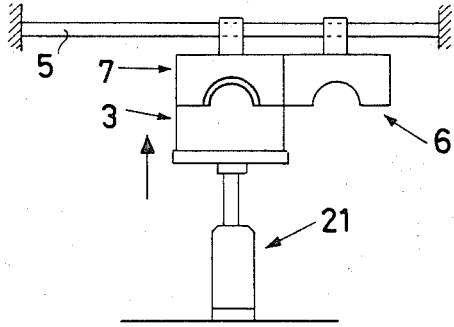

The counter-mould 3 is subsequently withdrawn together with the moulded layer (FIG. 4c) and the couple of moulds 6, 7 is horizontally shifted so that the mould 7 is positioned above the counter-mould 3 (FIG. 4d). The counter-mould 3 is then lifted and the second layer is moulded (FIG. 4e) by sintering, e.g. from high density expanded polystyrene.

Figure 4F:
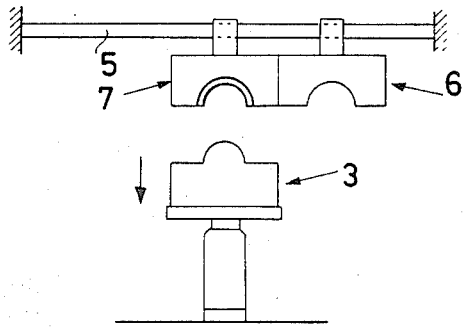

The counter-mould 3 is now withdrawn, but the article remains inside the mould 7, e.g. by suction, or because it is pushed to adhere to the mould 7 by the counter-mould 3 in its withdrawal step (FIG. 4f).

Figure 4G:
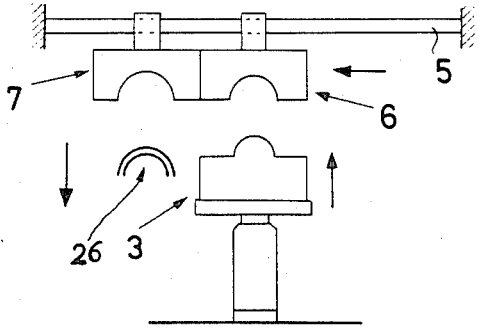

The pair of moulds 6 and 7 are returned into the initial position, and while the counter-mould 3 returns to its moulding position for the moulding of the first layer of a new article, the preceding article 26 is unloaded from the mould 7 into the container 25 (FIG. 4g).

As it can be noted, the machine allows it to quickly mould two-layer articles of any plastic material, it being possible to widely vary the arrangement and the thickness of the layers, as well as the combination of the materials being widely variable, so as to confer to the obtained article the desired properties without any difficulties.

For the moulding of a three-layer article, the machine is as shown in FIG. 3. It comprises, besides to the two moulds 6 and 7 and to the counter-mould 3, a further counter-mould 27 positioned laterally to the counter-mould 3 and solid with it. To the counter-mould 27 a compressed-air feeding line 28 and a duct 29 for feeding pre-foamed plastic material are connected, such duct 29 delivering a further material from the feeder 30 to the injector 31.

The counter-mould 27 is a male counter-mould, whose shape is of lower dimensions than the counter-mould 3. In the forming position the moulds 6 and 7 and the coupled counter-moulds 3 and 27 define hence moulding cavities of different volumetric dimensions. The two counter-moulds 3 and 27 are supported by longitudinal beams 32 and can be vertically moved together by means of two hydraulic cylinders 33 positioned in correspondence of the outer ends of the counter-moulds 3 and 27. As for the rest, the machine is substantially equal to the machine of FIGS. 1 and 2, therefore the same reference numbers have been maintained for equal or equivalent parts.

Figure 6:
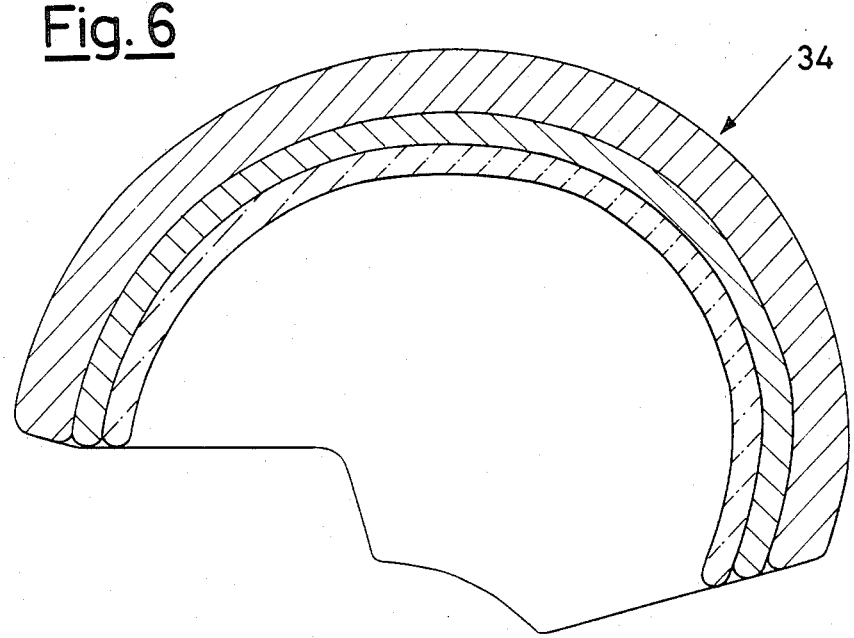
FIG. 6 is a longitudinal section through a motor cyclist helmet obtained with the machine of FIG. 3.
Figure 7:
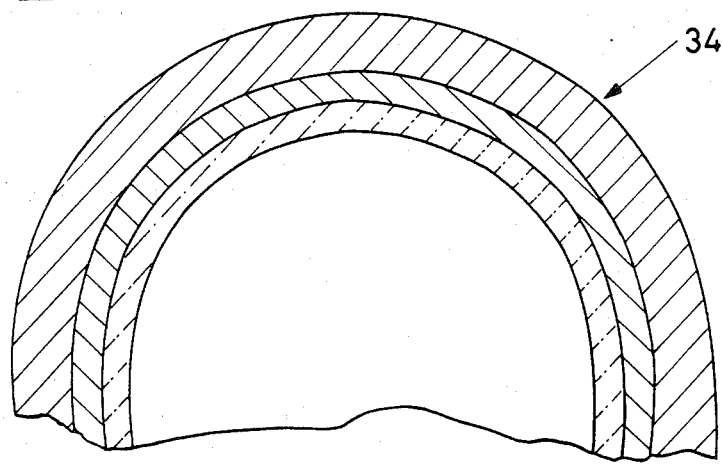
FIG. 7 is a cross section of the same helmet.

The manufacture of a three-layer article, such as e.g. a helmet 34 as illustrated in FIGS. 6 and 7 occurs as follows.

Figure 5A:
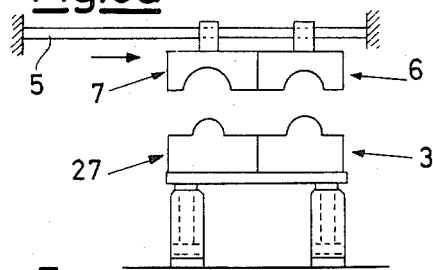
Figure 5B:
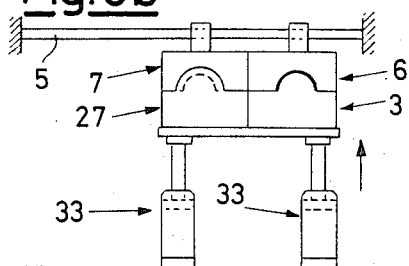

At first, the moulds 6 and 7 are moved into vertical alignment above the counter-moulds 3 and 27 (FIG. 5a) and these latter are then lifted against the moulds 6 and 7 into moulding position (FIG. 5b). The moulding of the first layer e.g. of a low-density expanded polystyrene is carried out between the moulds 6 and 3. The moulding technique may be one of those per se known, e.g., the moulding may be carried out by means of the sintering of beads of expanded polystyrene by means of steam.

Figure 5C:
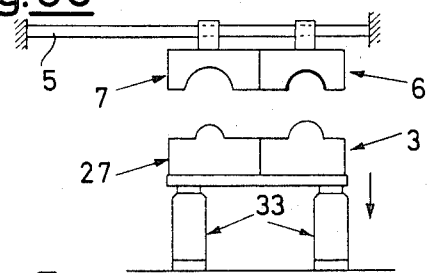
Figure 5D:
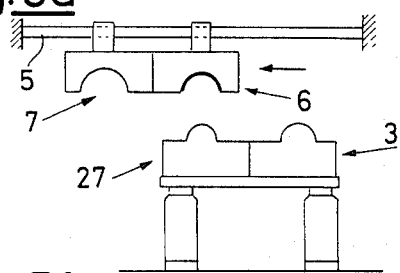
Figure 5E:
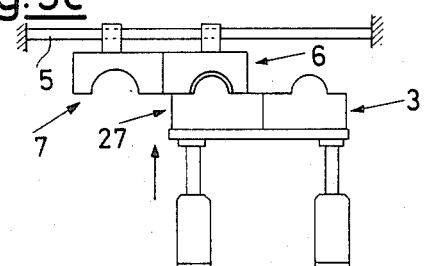

The counter-moulds 3 and 27 are then withdrawn (FIG. 5c), while the first moulded layer remains on the mould 6. The moulds 6 and 7 are horizontally shifted so as to bring the mould 6 above the counter-mould 27 (FIG. 5d). The couple of counter-moulds 3 and 27 is then lifted, and the moulding of a second layer of material, e.g., high-density expanded polystyrene, is carried out through the lower counter-mould 27 (FIG. 5e).

Figure 5F:
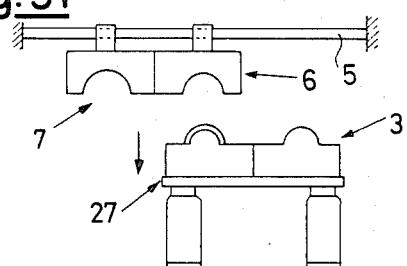
Figure 5G:
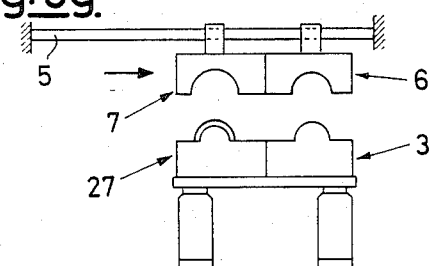
Figure 5H:
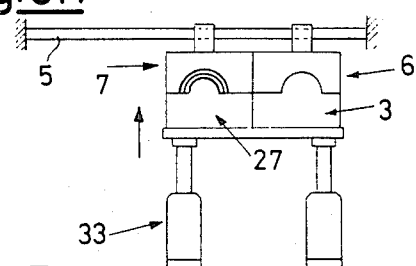

The counter-moulds 3 and 27 are then withdrawn (FIG. 5f) together with the two-layer article moulded up to now. At this time the horizontal shift of the two moulds 6 and 7 occurs to their position of vertical alignment above the moulds 3 and 27 (FIG. 5g), after which a new lifting of the counter-moulds 3 and 27 and the moulding of a new layer take place, this time through the upper mould 7 (FIG. 5h). This layer may be of e.g. low-density polystyrene.

Figure 5I:
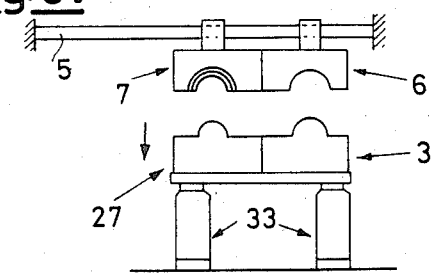

In the subsequent step, the article remains held within the upper mould 7, whilst the counter-moulds 3 and 27 are lowered (FIG. 5i). A horizontal shift of the moulds 6 and 7 is then carried out, to which the lifting of the counter-moulds 3 and 27 to their position of moulding follows, while the finished three-layer article 34 is unloaded (FIG. 5l).

It must be noted that at this time a second article is already being formed, whose first layer has been moulded in the step as of FIG. 5h, and whose second layer is mounted while the article to which reference was made in the above description, is being unloaded.

Figure 5L:
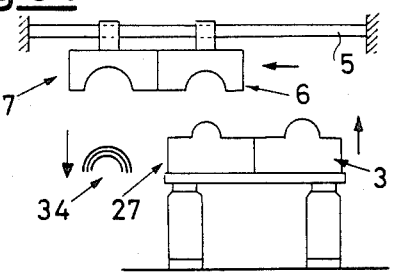

In other terms, the position of FIG. 5l corresponds to that of FIG. 5d. It can be thus understood how the manufacturing of the articles can be carried out in an extremely rapid way, precisely in such a way that at each moulding stage wherein the mould 6 and the counter-mould 26 are the one above the other, a finished article is unloaded.

It is to be noted also that in the manufacture of three-layer articles, the inner layer is first made, and the two outer layers are then made.

From the above, it is understood how with a relatively inexpensive equipment, multilayer articles can be obtained, e.g., articles of three layers, but also of more layers, wherein each layer is made of the most suitable product for the achievement of the desired characteristics in the finished article.

Of course, not necessarily the layers must be such as to cover the whole previously moulded portion. There might be had i.e. two, three or more materials only in certain areas of the product, and one material only in other areas, and so on.

Thus for instance a layer or certain portions thereof could be made of shock-absorbing material, another layer or certain portions thereof might be made of material resistant to the penetration of blunt bodies, and a certain layer or certain areas thereof might be made of more yielding material.

Among the materials which may be used, besides the already described ones, polyethylene and the copolymers styrene-acrylonitrile, styrene-maleic anhydride, styrene-ethylene-vinylacetate and many others may be mentioned like polypropylene and/or its copolymers or copolymers of polystyrene.

The use of the most suitable materials allows advantageously, in the case of helmets, the achievement of a greater comfort for the user both as for the wearing characteristics and the inner booming effect. The easiness of using two or more layers allows also e.g. helmets of two layers for larger head sizes, and three-layer for the smaller sizes to be manufactured.

Between the layers, inserts of different materials may be inserted, e.g. sheets of plastic or of metal material, nets of synthetic, natural or metallic material, small blocks, masks and the like. The sheets may be pre-formed, or they may be formed and inserted during the moulding stage.

It is to be noted that moulding each time of a superimposed portion or layer causes the already moulded portion or layer to behave as a hindrance for the passage of steam between the mould and the counter-mould. To obviate this problem it is suggested to improve the moulding technique in the sense of supplying steam impulses during moulding of the second or third portion or layer, the impulses ensuring sintering of the material of the second or third portion or layer also in the regions of the portions or layers contacting each other.

What is claimed is:

1. Machine for the manufacturing of moulded articles of plastic material, in particular of helmets for motor cyclists, said machine comprising:

at least two moulds, and at least one counter-mould to be coupled with each of said least two moulds for the forming of said articles, each of said at least two moulds and said at least one counter-mould defining moulding cavities therebetween, at least two of said at least two moulds and said at least one counter-mould being connected with feed means having a different pre-foamed plastic material, each of said at least two moulds being movable into alignment with said at least one counter-mould in a position for the moulding of respective at least partially superimposed layers of different foamed plastic material by sintering of said material, steam means for supplying steam impulses to said moulding cavities during moulding of the material at each heating of the mould cavities said means being positioned to ensure sintering of the material of each layer of material and one of said at least two moulds being positioned for unloading of an article produced while at least another of said at least two moulds is in another position coupled with the counter-mold for moulding and sintering of the respective material.

2. Machine according to claim 1, wherein said at least two moulds are positioned side-by-side and are horizontally movable to reach a position of vertical alignment with said at least one counter-mould which is vertically movable.

3. Machine according to claim 1, wherein said at least two moulds and said at least one counter- mould is of the type suitable to the moulding of expanded polystyrene by sintering with steam.

4. Machine according to claim 1, wherein said at least two moulds and said at least one counter-mould include two moulds and a counter-mould defining in a forming position a moulding cavity substantially of hemi-shell shape for the moulding of a two-layer article of bowl shape.

5. Machine according to claim 1, said at least two moulds and said at least one counter-mould include two moulds and two counter-moulds defining in a forming position moulding cavities of substantially hemi-shell shape, the counter-moulds being male counter-moulds and the moulds being female moulds, one female mould with a smaller-size cavity than the other female moulds being suitable to be successively coupled to one male counter-mould of greater size and then to the other male counter-mould of smaller size , while the female mould with cavity of greater size is suitable to be coupled to the male counter-mould of smaller size, while being fed with pre-foamed plastic material, for the moulding of a three-layer article of bowl shape.

6. Machine according to claim 1, wherein said at least two moulds and said at least one counter-mould include two moulds positioned side-by-side and two counter-moulds positioned side-by-side, defining in a mutually coupled position moulding cavities of substantially hemi-shell shape of different volumetric size, one of said counter-moulds being connected with feed means for pre-foamed plastic material.

* * * * *